United States Patent
Sierwald (10) Patent No.: US 9,310,480 B2
(45) Date of Patent: Apr. 12, 2016

(54) METHOD AND ARRANGEMENT FOR REMOVING GROUND CLUTTER

(71) Applicant: Jorn Sierwald, Kiel (DE)

(72) Inventor: Jorn Sierwald, Kiel (DE)

( * ) Notice: Subject to any disclaimer, the term of this patent is extended or adjusted under 35 U.S.C. 154(b) by 190 days.

(21) Appl. No.: 14/271,796

(22) Filed: May 7, 2014

(65) Prior Publication Data

US 2014/0333475 A1 Nov. 13, 2014

Related U.S. Application Data

(60) Provisional application No. 61/820,791, filed on May 8, 2013.

(51) Int. Cl.
| | |
|---|---|
| *G01S 13/95* | (2006.01) |
| *G01S 13/524* | (2006.01) |
| *G01S 13/532* | (2006.01) |
| *G01S 13/22* | (2006.01) |

(52) U.S. Cl.
CPC .............. *G01S 13/95* (2013.01); *G01S 13/5244* (2013.01); *G01S 13/532* (2013.01); *G01S 13/951* (2013.01); *G01S 13/227* (2013.01)

(58) Field of Classification Search
CPC ... G01S 13/95; G01S 13/532; G01S 13/5244; G01S 13/951; G01S 13/227
USPC ..... 342/26 R, 26 A–26 D, 159, 162, 195–196
See application file for complete search history.

(56) References Cited

U.S. PATENT DOCUMENTS

| | | | |
|---|---|---|---|
| 3,938,145 A * | 2/1976 | Brook ................... | G01S 13/951 342/159 |
| 4,268,828 A * | 5/1981 | Cribbs .................. | G01S 13/951 342/196 |
| 5,311,183 A * | 5/1994 | Mathews .............. | G01S 13/953 342/26 B |
| 5,907,568 A * | 5/1999 | Reitan, Jr. ................. | G01S 7/22 342/181 |
| 7,589,666 B2 | 9/2009 | Passarelli, Jr. et al. | |

(Continued)

FOREIGN PATENT DOCUMENTS

| | | | | |
|---|---|---|---|---|
| FR | WO 9938028 A1 * | 7/1999 | ............. | G01S 7/025 |
| JP | 2278353 A2 * | 1/2011 | ............. | G01S 7/025 |
| WO | WO 9735209 A1 * | 9/1997 | ............. | G01S 13/95 |

OTHER PUBLICATIONS

Warde, D.A.; Torres, S.M., "The Autocorrelation Spectral Density for Doppler-Weather-Radar Signal Analysis," in Geoscience and Remote Sensing, IEEE Transactions on , vol. 52, No. 1, pp. 508-518, Jan. 2014.*

(Continued)

*Primary Examiner* — John B Sotomayor (57) ABSTRACT

A digital radar receiver generates the input signal which is a stream of complex numbers. The input signal is rearranged and sorted by measurement volumes, resulting in Doppler data vectors. Doppler data vectors are filtered using a number of different digital filters. The output Doppler data vectors of the filters together with the original Doppler data vector are the candidate signals. Each candidate signal is analyzed using several criteria in order to find the one signal which is most likely to be caused by precipitation and has the ground clutter removed by the filtering. The selected signal is then used to calculate the meteorological products. The selected signal is also used to derive a velocity value or velocity distribution while taking into account the effects of the filtering performed earlier.

12 Claims, 6 Drawing Sheets

(56) References Cited

U.S. PATENT DOCUMENTS

| | | | | |
|---|---|---|---|---|
| 7,652,614 | B2* | 1/2010 | Venkatachalam | G01S 7/292 342/159 |
| 8,098,192 | B1* | 1/2012 | Wichgers | G01S 13/94 342/26 B |
| 8,665,144 | B2* | 3/2014 | Venkatachalam | G01S 13/951 342/188 |
| 2010/0090884 | A1* | 4/2010 | Venkatachalam | G01S 13/5244 342/159 |
| 2011/0304501 | A1* | 12/2011 | Marui | G01S 13/958 342/26 R |
| 2013/0154875 | A1* | 6/2013 | Sierwald | G01S 13/958 342/192 |
| 2013/0332115 | A1* | 12/2013 | Pratt | G01N 22/04 702/190 |
| 2014/0333475 | A1* | 11/2014 | Sierwald | G01S 13/95 342/26 R |

OTHER PUBLICATIONS

Bachmann, Svetlana; Zrnic, D.; DeBrunner, V., "Polarimetric Azimuthal Spectral Histogram Exposes Types of Mixed Scatterers and the Cause for Unexpected Polarimetric Averages," in Image Processing, 2007. ICIP 2007. IEEE International Conference on , vol. 4, No., pp. IV-113-IV-116, Sep. 16, 2007-Oct. 19, 2007.*

Lagha, M.; Bensebti, M., "Performance Comparison of Pulse Pair and 2-Step Prediction Approach to the Doppler Estimation," in Industrial Electronics, 2006 IEEE International Symposium on , vol. 1, No., pp. 709-714, Jul. 9-13, 2006.*

J.C. Hubbert, et al.; "Weather Radar Ground Clutter. Part II: Real-Time Identification and Filtering"; Jul. 2009; vol. 26; pp. 1181-1197.

J.C. Hubbert, et al.; "Weather Radar Ground Clutter. Part I: Identification, Modeling, and Simulation"; Jul. 2009; vol. 26; pp. 1165-1180.

* cited by examiner

METHOD AND ARRANGEMENT FOR REMOVING GROUND CLUTTER

1 TECHNICAL FIELD

The present invention is generally related to the technology of processing the signals received in a remote sensing apparatus. Especially the invention is concerned with the task of removing unwanted signal components, such as ground clutter, from the signal received in a remote sensing apparatus such as a pulse radar.

2 BACKGROUND OF THE INVENTION

Clutter, or more specifically ground clutter, is the general designation of signal contamination in the form of echoes or reflections that a remote sensing instrument, such as a weather radar for example, gets from trivial, unwanted, stationary targets. A major task of a weather radar is to measure the reflectivity and speed (relative to the radar station) of airborne precipitation, i.e. raindrops and ice particles, in which task strong echoes from stationary obstacles are a nuisance. A number of signal processing approaches have been developed to remove ground clutter, while simultaneously salvaging as much of the actual measurement signal as possible.

A stationary reflector does not cause any phase shift between consecutive reflected pulses. Consequently a widely used approach is to examine the signal in the frequency domain (i.e. after performing an FFT) and to filter out those parts of the frequency spectrum that correspond to velocities at or near 0 m/s, either by deleting them completely or by interpolating over them with the help of data from the neighboring velocity bins. However, not all ground clutter comes from exactly stationary objects. For example a forest through which a wind blows contains a large number of individual reflectors, the velocities of which form a certain distribution around zero. Even a perfectly stationary reflector gives rise to a distribution in the frequency domain because the antenna rotates, so objects come into and go out of view.

The frequency domain approach works reasonably well with conventional pulse radars, but not with a more sophisticated one with multiple pulse repetition times. A radar of the last-mentioned kind is commonly referred to as a Multi-PRT radar, where PRT means pulse repetition time. The advantage of Multi-PRT is its far greater velocity range: with Multi-PRT it is possible to measure all naturally occurring wind speeds, while a conventional single-PRT pulse radar with a reasonable pulse repetition frequency can only measure up to 6 m/s in a C-Band radar. However, the cost is the modest signal-to-noise ratio of a Multi-PRT radar in the frequency domain. A single-PRT radar that employs the conventional approach for ground clutter removal may detect a rain signal that has a power of 50 dB below the power of the reflections from the ground, but an FFT calculated from the received signal of a Multi-PRT radar will contain a multitude of artifacts and noise at about 25 dB below the power level of the ground-reflected signal. This would mean that the Multi-PRT radar could only recover from at most 25 dB of ground clutter, which for many applications is not enough.

The industry standard clutter removal algorithm GMAP (Gaussian model adaptive processing) by Sigmet Inc. (U.S. Pat. No. 7,589,666 B2) performs poorly with Multi-PRT radar as it operates in the frequency domain. It also does not benefit from the information provided by modern dual-polarization weather radar. The US-American national weather service has upgraded their weather radar network to dual-polarization from 2011 to 2013. (http://www.roc.noaa.gov/wsr88d/dualpol/DualPolOverview.aspx)

3 SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to provide a method and an arrangement for removing interfering signal components, like ground clutter for example, from the measurement data produced by a remote sensing instrument that sends and receives pulses at multiple repetition intervals. The invention does not depend on multiple repetition intervals though, it will work with just one interval as well. An additional objective of the invention is to produce such a method and arrangement which are so fast that the removal of ground clutter can be performed in real time. A further objective of the invention is to produce such a method and arrangement that enable reaching signal-to-noise ratios that are sufficient for weather radars.

The objectives of the invention are achieved by subjecting the received signal to test runs of digital filtering, thus providing a set of candidate signals, and selecting the candidate signal that best matches a set of criteria. In weather radar, the criteria will be characteristic of a precipitation-originated signal. A velocity value or velocity distribution for a current measurement volume is derived from the selected candidate signal.

According to an aspect of the invention there is provided a method for processing a signal. The method is characterized by the features recited in the characterizing part of the independent claim directed to a method. According to another aspect of the invention there is provided a signal processing apparatus. The apparatus is characterized by the features recited in the characterizing part of the independent claim directed to an apparatus.

According to yet another aspect of the invention there is provided a remote sensing arrangement. The arrangement is characterized by the features recited in the characterizing part of the independent claim directed to an arrangement.

According to yet another aspect of the invention there is provided a computer program product, which is characterized by the features recited in the characterizing part of the independent claim directed to a computer program product.

Statistical analysis can be applied to derive a general form of an optimal digital filter for removing ground clutter. However, ground clutter removal is most advantageously switched on only for those measurement volumes that actually do contain ground clutter. Among those, the filtering should be accomplished with a different emphasis depending on how large the effect of the ground clutter was. This task can be advantageously combined with the task of judging measurement volumes by the presence of ground clutter: a number of differently emphasized digital filters are used to provide candidate signals, one of which is the original radar echo without filtering. The candidate signals can be evaluated in terms of how well they match a set of criteria of a precipitation-originated signal, and the best candidate signal can be chosen.

Single-polarization weather radars send and receive horizontally polarized pulses and signals. Modern dual-polarizations weather radars send and receive both horizontally and vertically polarized pulses and signals. An aspect of the invention is the use of signal processing to perform a combined analysis of both received signals in order to distinguish precipitation-originated signal components from ground clutter.

The exemplary embodiments of the invention presented in this patent application are not to be interpreted to pose limitations to the applicability of the appended claims. The verb "to comprise" is used in this patent application as an open limitation that does not exclude the existence of also unrecited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

5 DEFINITION AND TERMS

Input signal The stream of complex numbers generated by the digital receiver. A typical data rate is one complex number per microsecond Doppler data vector A selection of data from the input signal. Only data belonging to one specific range from the radar is collected. The Doppler phase shift is calculated from the members of this vector.

Measurement Volume The output of the signal processing software forms a grid in polar coordinates when viewed from above. The output can be combined with a map of the surroundings of the radar when presented to the radar operator. The elements of the grid have a certain size, for instance one degree wide and 150 meters long. They also have a height which depends on the shape of the radar beam. The elements in the grid are called measurement volumes. See FIG. 3 for an example with the measurement volume 301.

Indicator A product that can be calculated from the data of one or more Doppler data vectors.

Multi-PRT Rather than having one fixed interval between pulses, a pattern of intervals (for instance 3 intervals) is used.

The pattern is repeated.

Cycle In Multi-PRT, the cycle is one repetition of the interval pattern. The cycle length is the sum of the intervals.

6 DETAILED DESCRIPTION OF EMBODIMENTS OF THE INVENTION

The speed of light is approximately 300 m/μs and the microwave pulse travels at that speed but the echo has to travel all the way back to the antenna from an increasing distance. The measured range at which observations are made thus increases by 150 m/μs, not 300 m/μs.

Figure 1:
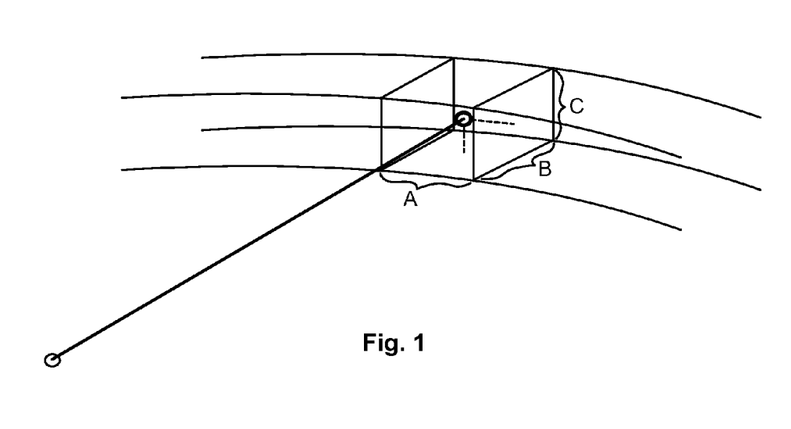
FIG. 1 illustrates a measurement volume of a weather radar

Weather radar measurements aim at characterizing the meteorological phenomena up to a certain maximum range from the radar transceiver with a certain spatial resolution. FIG. 1 illustrates how a measured point actually corresponds to a volume. The width A of the volume is the selected azimuthal output resolution, which is for example one degree. Its length B is the range resolution, and its height C equals the width of the antenna beam in the vertical direction.

The data coming from the receiver is a stream of complex numbers that represents the echo from a pulse the radar has sent. The range resolution is defined by the data rate, which can be for example one MHz. This translates to one complex number covering a range of 150 meters (i.e. B=150 m in FIG. 1). To record the echo from one pulse traveling to the edge of the troposphere (that's about 450 km when the radar is aimed as low as possible) is would take 3000 complex samples. Weather radars are seldom powerful enough to measure anything 400 km away, therefore the practical range is typically limited to 300 km except for extreme thunderstorms. This range determines how often one can send pulses.

To travel the 300 km and back it takes the pulse two ms, which is therefore a commonly selected interval between pulses. The interval length is called pulse repetition time (PRT), and its inverse is called pulse repetition frequency (PRF). A PRT of two ms is a PRF of 500 Hz. A typical pulse length is one μs, which matches the range resolution of 150 meters described above.

Figure 2:
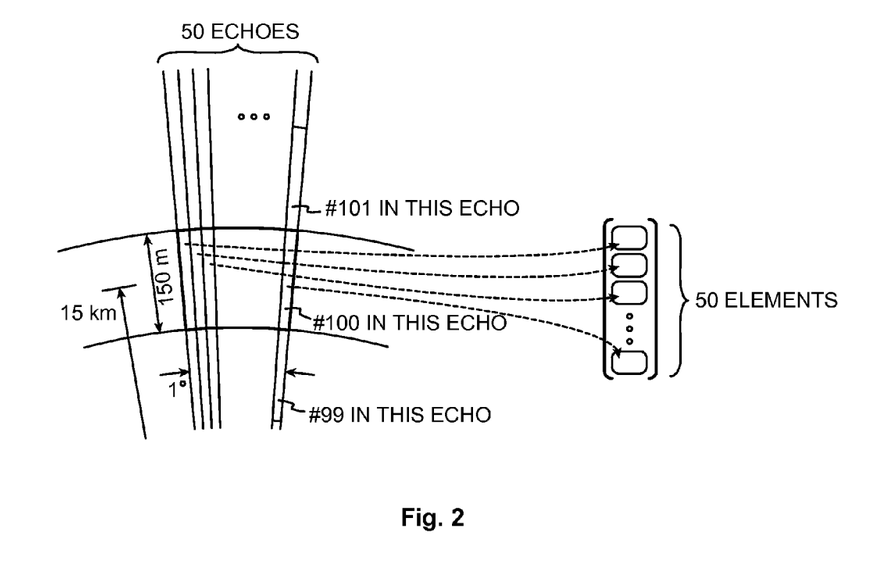
FIG. 2 illustrates some numerical values related to a typical measurement volume

A Doppler radar analyzes the signal coming from a fixed range from the radar. That means it reorders the incoming data. To analyze the weather at 15 km away, the 100th sample from each 3000-sample-long echo is taken and put into a vector we call the Doppler data vector. For a common output resolution of one degree of antenna rotation, we take as many samples as it takes to rotate through one degree, for instance 50 samples if the antenna rotates 10 degrees per second and sends a pulse every two ms. The signal processing mostly deals with these vectors of 50 samples, each vector describing a volume of air 150 meter long, one degree wide (as seen from the antenna) and one degree high. These exemplary numerical relations are illustrated in FIG. 2, which may be taken to show the measurement volume of FIG. 1 from above. Since the antenna beam is not ideal, the data will contain some reflected power from adjacent volumes to the left and right and up and down as well.

Figure 3:
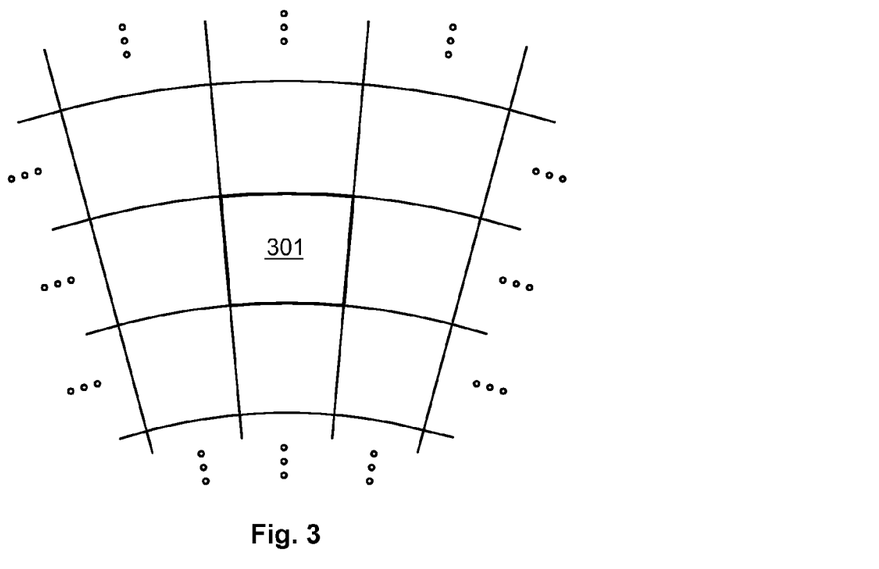
FIG. 3 illustrates a two-dimensional map of measurement volumes

Separating the effect of meteorological phenomena from ground clutter benefits from observing transitions and trends in the measurement through larger regions than just one measurement volume. FIG. 3 is a schematic map that shows a measurement volume 301 and some of its immediate neighboring volumes in a plane, the coordinates of which are antenna azimuth and range. If the antenna can be scanned up and down or if vertical resolution is otherwise provided, there can be upper and/or lower neighboring volumes as well. We may refer to one-dimensional (for example only range, or only azimuth), two-dimensional (typically range+azimuth), or three-dimensional (range, azimuth, and height) neighbor analysis. Time can be taken as a coordinate as well; the regular movement of the antenna means that same measurement volumes will be measured repeatedly, so that consecutive measurements of a particular measurement volume constitute neighbors to each other on the time coordinate axis.

Figure 4:
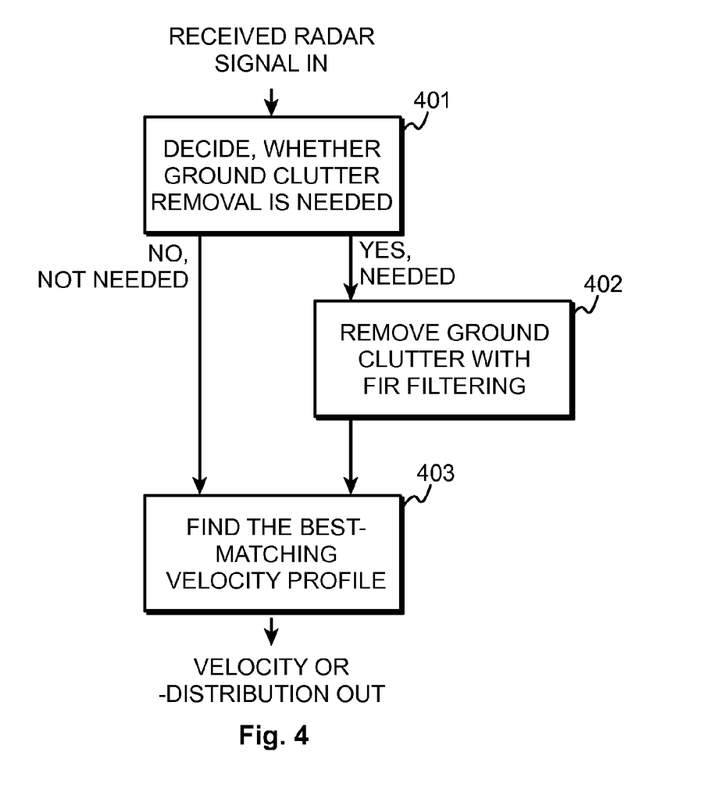
FIG. 4 illustrates a general view of a method for removing ground clutter

Ground clutter removal should only be applied to measurement signals that actually contain ground clutter. The ground clutter removal filter typically removes all power from signal components with a perceived velocity of zero m/s regardless of the source. If precipitation happens to have a velocity of zero m/s if will be removed by the filter and the rainfall will be displayed incorrectly. FIG. 4 illustrates on a general level a method for processing a received radar signal according to an embodiment of the invention. Here we look at the received radar signal that represents one measurement volume. At step 401a judgment is made, whether the received radar signal for the current measurement volume seems to contain ground clutter that should be removed. If it does, ground clutter removal is applied at step 402. The signal that was found to not contain ground clutter at step 401, or the signal from which ground clutter was removed at step 402, is then taken to step 403. This step comprises examining, which velocity value (or, more generally, which set of velocity values that together constitute a velocity distribution) would explain best the received signal.

The steps of FIG. 4 are not necessarily performed separately: for example, the judgment at step 401 and the ground clutter removal at step 402 can be accomplished in a common phase of the method in a way that is explained in more detail later in this text.

7 TELLING A CLEAN SIGNAL FROM A CORRUPTED ONE

According to an aspect of the invention there is provided a systematic and adaptive method for recognizing such measurement data that is so corrupted by ground clutter that actively removing ground clutter could improve the output. Instead of making the recognition according to some particular, individual decision rule, it is advantageous to use a decision-making pattern that takes into account a number of criteria. According to another aspect of the invention a matrix of measurement volumes are subjected to various degrees of filtering for removing ground clutter, so that the eventual output may contain unfiltered volumes as well as volumes that are more or less heavily filtered.

We will first consider a number of indicators that can be used to evaluate whether a measurement contains clutter.
7.1 Autocorrelation of the Received Signal A prior art publication J. C. Hubbert, M. Dixon, S. M. Ellis, and G. Meymaris: "Weather Radar Ground Clutter", Parts I and II, Journal of Atmospheric and Oceanic Technology, Vol. 26, Issue 7, 2009 suggests analyzing the so-called Clutter Phase Alignment or CPA, which should reveal ground-clutter-corrupted measurements based on the relatively stable phase of ground clutter. A better way to obtain an indicator of similar kind is to calculate the complex autocorrelation function of the received signal at a few chosen lags. Even calculating the autocorrelation function at the cycle length only produces useful information.

A signal that reflects from a static objects exhibits only slow change over time. The fact that some change still exists, even if the reflecting object is completely stationary, is a consequence of static objects coming into sight and going out of sight as the antenna rotates. The change over time in a signal that reflected from precipitation is typically much faster.

This difference can be utilized by calculating the autocorrelation of the received signal from a measurement volume. The autocorrelation is preferably calculated over a period of time that is at most as long as the time that a stationary object will remain within the antenna beam. An autocorrelation value close to one (1+0*j) (j being the imaginary unit) means that only little change was observed, while a smaller autocorrelation value suggests that the measurement volume in question is dominated by precipitation. The autocorrelation value is thus a relatively simply obtainable descriptor that can be used in judging, whether the measurement volume contained ground clutter or not.

The autocorrelation function is most useful if the signal is dominated by ground clutter. If only a small part of the power in the signal is ground clutter, the function value will not be close to one. Nevertheless the autocorrelation function has been used as it is available even in single-polarization radar whereas most of the following criteria are not.
7.2 Copolar Differential Phase Copolar differential phase $\Phi_{dp}$ is a very effective tool to tell a precipitation-originated signal from ground clutter. It is only available in dual-polarization radars and is calculated using both horizontal and vertical input signal. Copolar differential phase is the sum of differential propagation phase and differential backscatter phase. In precipitation it shows little variability and increases slowly with increasing range. Ground clutter, on the other hand, has a high variability of copolar differential phase between ranges. If $\Phi_{dp}(r)$ is the complex copolar differential phase at range r, a descriptor of its variability should be defined so that it reflects the amount of change that can be observed between the copolar differential phase values of neighboring measurement volumes. If the neighborhood of measurement volumes is considered solely in the range direction, such a $\Phi_{dp}$ variability descriptor can be calculated for example as $$|\Phi_{dp}(r)-\Phi_{dp}(r-1)|^2+|\Phi_{dp}(r)-\Phi_{dp}(r+1)|^2 \qquad (1)$$

Correspondingly if the measurement volume at an azimuthal coordinate $\Theta$ is compared to its nearest neighbors in the azimuthal direction, a descriptor of the variability of its copolar differential phase could be calculated as $$|\Phi_{dp}(\Theta)-\Phi_{dp}(\Theta-1)|^2+|\Phi_{dp}(\Theta)-\Phi_{dp}(\Theta+1)|^2 \qquad (2)$$

A descriptor of variability could even be defined in terms of a height coordinate h, if measurements from different antenna elevations are available. An exemplary formula is $$|\Phi_{dp}(h)-\Phi_{dp}(h-1)|^2+|\Phi_{dp}(h)-\Phi_{dp}(h+1)|^2 \qquad (3)$$

Further possible ways of calculating descriptor values for $\Phi_{dp}$ variability can be defined by taking two or three coordinates into account simultaneously. For example a descriptor value that takes into account both the r and $\Theta$ directions could be obtained as $$|\Phi_{dp}(r,\Theta)-\Phi_{dp}(r-1,\Theta)|^2+|\Phi_{dp}(r,\Theta)-\Phi_{dp}(r+1,\Theta)|^2+$$

$$|\Phi_{dp}(r,\Theta)-\Phi_{dp}(r,\Theta-1)|^2+|\Phi_{dp}(r,\Theta)-\Phi_{dp}(r,\Theta+1)|^2 \qquad (4)$$

Variability in the range direction is believed to be much more significant than variability in the other directions. Large measurement-volume-specific values of a descriptor of variability of $\Phi_{dp}$ calculated according to any of the possible versions shown above indicate that the measurement volume under consideration contains significant ground clutter or noise. It is naturally possible to define such a descriptor with some formula that results in an inverse relation, i.e. so that the larger the value, the less ground clutter or noise.

7.3 Shift in Copolar Differential Phase Caused by Filtering

For each range, an expected value of the copolar differential phase $\Phi_{dp}$ can be calculated. Since $\Phi_{dp}$ is expected to show a small linear increase with increasing range, the expected values can be calculated using linear regression, for example in the form of weighted least-square fitting. The weights used in the weighted least-square fitting can be taken from the variance of the $\Phi_{dp}$ calculation. The result of the linear regression analysis is an expected value of $\Phi_{dp}$ for each measurement volume. If the measured sector as a whole does not contain enough precipitation to give meaningful measurements for use as a basis for the linear regression analysis, the expected value of $\Phi_{dp}$ for each measurement volume can be derived from the known parameters of the radar configuration.

Difference to the expected value of $\Phi_{dp}$ can be used as a descriptor value, especially in a case where multiple candidate signals representative of a particular measurement volume are compared to each other. As will be explained in more detail later, such candidate signals may comprise an original (unfiltered) signal and a number of filtered signals obtained by filtering the original signal with filters of progressive aggressiveness. For example, if the expected value of $\Phi_{dp}$ is 110 degrees, and the $\Phi_{dp}$ values for the candidate signals are 304 degrees for #1, 120 degrees for #2, 119 degrees for #3, and 200 degrees for #4, the signals #2 and #3 are the best in light of this descriptor. Whether one should choose #2 or #3 in such an exemplary case is a matter of how the decision rules are made: one may look for the absolutely smallest difference to the expected $\Phi_{dp}$ value and choose #3, or one may prefer the least aggressively filtered one of two almost equal candidate signals and choose #2.

In the case of a number of candidate signals the calculation of the expected $\Phi_{dp}$ values, for example, by linear regression, must use one of the candidate signals as a basis. The selection can be made in various ways. Since it is likely that ground clutter occurs in at least some of the measurement volumes of the sector in which the expected values of $\Phi_{dp}$ are calculated, it is not preferable to use the unfiltered candidate signal. On the other hand, using the most aggressively filtered candidate signal would be justified only if one assumed a majority of the measurement volumes to contain ground clutter. A preferable choice is to use a candidate signal that has been subjected to some medium-level filtering.

7.4 Power Variability

The total power received from range r is written as P(r). A descriptor of its variability should be defined so that it reflects the amount of change that can be observed between the total power values of neighboring measurement volumes. If the neighborhood of measurement volumes is considered solely in the range direction, such a P(r) variability descriptor can be calculated for example as $$\frac{\max(P(r), P(r-1))}{\min(P(r), P(r-1))} + \frac{\max(P(r), P(r+1))}{\min(P(r), P(r+1))} \qquad (5)$$

In analogy with the azimuth-dependent variations above at least the following alternative can be used:

$$\frac{\max(P(\Theta), P(\Theta-1))}{\min(P(\Theta), P(\Theta-1))} + \frac{\max(P(\Theta), P(\Theta+1))}{\min(P(\Theta), P(\Theta+1))} \qquad (6)$$

Further alternative definitions can again be obtained for example by taking into account the height coordinate, similarly to the variation of copolar differential phase. Also here the range coordinate is considered to be the most significant.

If received power is constant, i.e. there is zero variability in power, the value of each individual ratio on the formulas above is one, so the descriptor value indicating zero variability is equal to the number of ratios summed together in the formula. The larger the measurement-volume-specific variability in power, the larger the indicator value. Again, it is possible to define a power variability descriptor with some formula that results in an inverse relation, i.e. so that the larger the value, the less variability. The formulas given above define the measurement-volume-specific variability of power so that values smaller than a predefined limit indicate a precipitation-originated radar echo.

7.5 Power Loss Caused by Filtering

If a set of measurement data that represents a measurement volume is filtered with a digital filter, deductions about ground clutter can be made depending on what happens to the total signal power. However, power loss caused by filtering is closely related to also other factors than ground clutter, so the deductions must be made in an educated way.

For example, at several velocities which depend on Multi-PRT pulse timing and occur at integral multiples of a particular velocity, applying a basic digital filter in the time domain will remove significant amounts (5 dB or more) of power even when the signal did not contain ground clutter at all. Also at the so-called "zero isodop" line which is the boundary between negative and positive velocities, large reductions in power caused by filtering are normal. If we consider power loss caused by filtering on one hand and improvements in other descriptors on the other, the following two-by-two set of basic rules can be obtained:

very little power loss, but improvement in the other descriptors→original signal probably contained ground clutter and should be filtered very little power loss, and also no improvement in the other descriptors→original signal should not be filtered (actually: there is relatively little significance in whether it is filtered or not)

significant power loss and improvement in the other descriptors→original signal should probably be filtered, but more information should be obtained by looking at what the other descriptors say significant power loss, and no improvement in the other descriptors→nothing can be said for sure, and the decision of whether to filter or not should be made on other grounds.

7.6 Saturation

The occurrence of saturation, i.e. signal power that exceeded the upper limit of the dynamic range in the receiver in some measurement volume, is not an indicator comparable to those explained above: it renders all analysis or ground clutter removal in that measurement volume pointless. It is mentioned here only because of the neighboring-volume-related aspects of some of the descriptor values. A measurement volume where saturation occurred should be marked as invalid. It should not be used as a reference in any neighboring-volume-related evaluation, and it should also be skipped in integrations made over any group of measurement volumes.

If the digital filter uses only data from the Doppler data vector belonging to one measurement volume at a time, saturation in one volume will not affect neighboring volumes. If the filter uses more data, for instance using a high-order FIR filter than covers more than one volume, the filtering itself will destroy the data in the volumes next to the volume where the saturation occurs. For this reason, the order of any filtering in the time domain should be kept low, or the filtering should be done with several filters of different order, the lower-order filters used as backup.

7.7 Copolar Correlation Coefficient

For a measurement volume that contained only ground clutter the copolar correlation coefficient $\rho_{co}$ is essentially a random number between 0 and 1, while for measurement volumes dominated by precipitation it may be between 0.9 and 1, or at least larger than 0.7 (for example a measurement volume having $\rho_{co}$<0.9 is quite probably dominated by precipitation if it has a neighboring measurement volume with $\rho_{co}$>0.9. However, the possible value ranges indicating precipitation or ground clutter overlap so much that the copolar correlation coefficient is not a very reliable descriptor. It can be used, for example, as a tiebreaker, if all other descriptors of a measurement volume seem to indicate an equal probability of ground clutter or not. Another possibility is to use an improvement caused in $\rho_{co}$ as a descriptor value. If, for example, there are four candidate signals #1, #2, #3, and #4 of the kind discussed earlier under subheading E, and their $\rho_{co}$ values are 0.91, 0.94, 0.94, and 0.89 in this order, an improvement is seen between #1 and #2, which makes #2 the best choice in light of this descriptor.

7.8 Calculating the Signal Part Removed by the Filter

If the output vector of one filter is subtracted from the input vector, the signal compovent removed by the filter becomes available for analysis. The copolar correlation and the copolar differential phase can be calculated for this removed component and compared to the output signal. If the signal component which was removed and the signal component that remains have very similar copolar differential phase and high copolar correlation they are probably both caused by the same precipitation. This will happen if the velocity of the precipitation is near zero and the filter will split the signal into the component at velocity zero and the component slightly below and above zero.

This test can be used to switch off the ground clutter filtering.

8 DECISION MAKING

Figure 5:
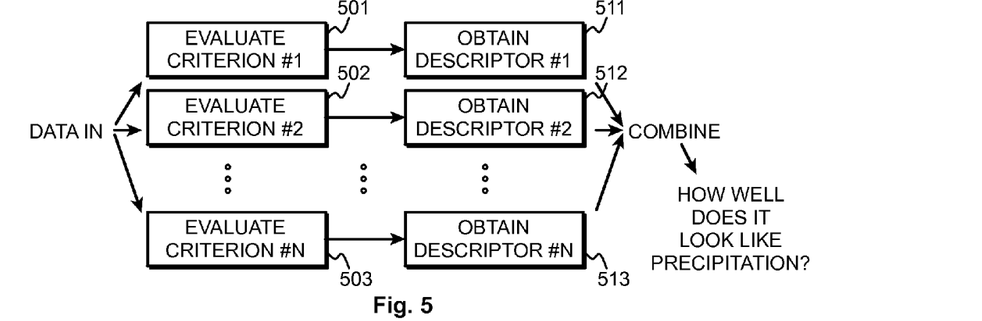
FIG. 5 illustrates a method for evaluating a set of measurement data

FIG. 5 is a schematic illustration of how a set of measurement data can be evaluated regarding how much it looks like a signal that is dominated by precipitation. In other words, using the method illustrated in FIG. 5 it is possible to make a decision whether the set of measurement data is "clean", or whether it contains a significant contamination in the form of ground clutter.

The measurement data is independently evaluated against a number of criteria at steps like those illustrated as 501, 502, and 503. With reference to the points 7.1 to 7.8 in the text above, the evaluations may include evaluating copolar differential phase, power variability, power loss caused by filtering, and the like. Each evaluation results in obtaining a descriptor value, which can be a simple numerical value or a complex value, at steps 511, 512 and 513. A value typically comes from an evaluation that is calculation by nature: for example the power variability observed at a particular measurement volume, which is a real number, or the power loss caused by filtering, which is a value in decibels.

The descriptor values can be combined in many ways. The combination should result in a judgment or combined evaluation that tells, how well did the measurement data look like precipitation. For example, the combination may involve calculating a weighted sum or a standard deviation, the value of which expresses the probability of the measurement data originating from precipitation. In another alternative each descriptor value can be compared against a limit value of its own, and if at least a predefined number of descriptor values exceed their limit (or if at least a predefined number of all descriptor values exceed their limit), the measurement data is decided to be contaminated by ground clutter. The limits can be fixed or they can be calculated from other descriptors. Many limits will depend on the signal-to-noise ratio of the input signal. Some descriptor values can cause other descriptors to be ignored entirely.

More sophisticated combination methods may involve feeding the obtained descriptor values into a neural network or a fuzzy logic evaluator, which has been trained to take into account not only the various descriptor values themselves but also other factors like their mutual relations, reliabilities, and so on.

Figure 6:
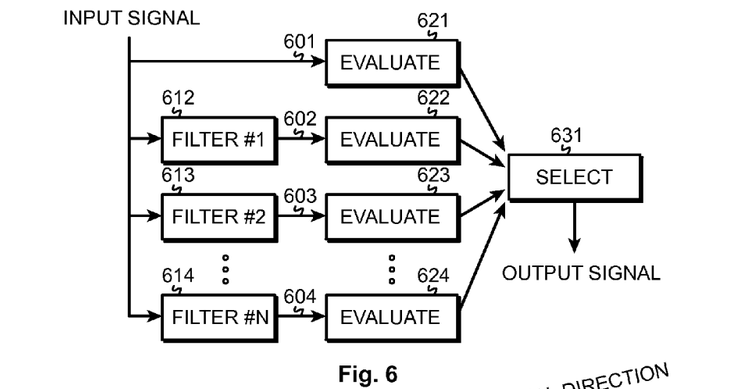
FIG. 6 illustrates a method for selecting an appropriate alternative among candidate signals

The combined result can be utilized for example to judge, whether the measurement data that describes a particular measurement volume can be taken as such, or whether it should be subjected to ground clutter removal. A slightly more elaborate way of utilizing the combined result is schematically illustrated in FIG. 6. The method of FIG. 6 involves the aspect of combining the ground clutter removal with the mere judgment of whether ground clutter was present or not.

Figure 7:
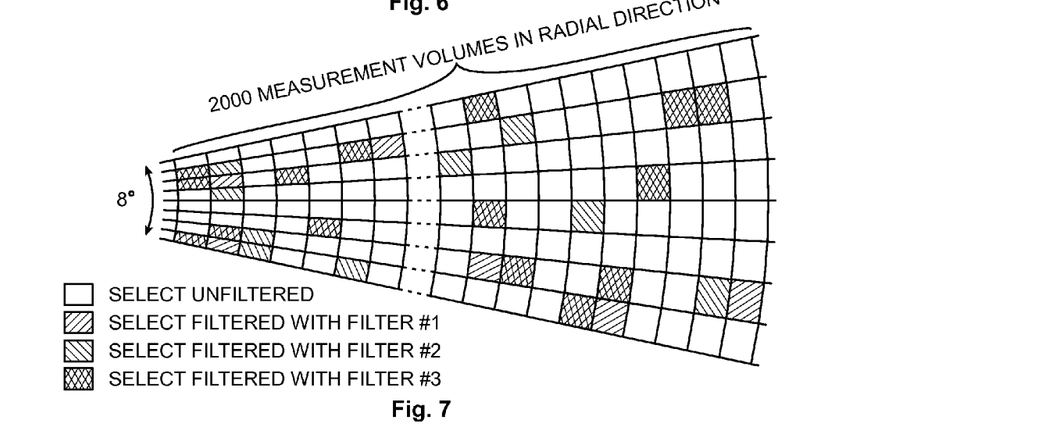
FIG. 7 illustrates a selection map

In FIG. 6 the input signal represents a number of measurement volumes, say, a two-dimensional sector that is 8 measurement volumes wide and 2000 measurement volumes long. Such a sector is illustrated in FIG. 7, where we assume that the width of each measurement volume is one degree. The length of the measurement volume depends on the pulse length and is typically 150 to 300 meters.

A number of candidate signals are formed; in FIG. 6 there are four. The first candidate signal 601 is the input signal without any filtering. The second, third, and fourth candidate signals 602, 603, and 604 are versions of the input signal that have been subjected to filtering with different filter parameters. The way in which the different filter parameters have been selected reflects how aggressively the filter in question removes ground clutter: the first filter 612 is designed to remove low amounts of clutter, while the second filter 613 can remove a large amount of ground clutter, and the third filter 614 is designed to filter as much ground clutter the radar input electronics can handle.

A filter of the kind meant here can be described as setting up an attenuation band centered at a measured velocity 0 m/s. The shape of the attenuation band can be freely chosen, for instance a rectangle or with the form of a Gaussian distribution. More advanced methods can analyze the beam shape of the antenna and the expected terrain to estimate a velocity distribution. The filter can also be constructed without any knowledge about the antenna by simply using a measurement volume which is known to contain only ground clutter and using its data for the filter construction. For Gaussian distributions there are two parameters: the width (usually called the sigma parameter), and its area in relation to the noise level (the power ratio of ground clutter over noise). With exemplary values 0.1 m/s for the sigma parameter and 1000 for the power ratio, the velocities that will be affected by the filter are approximately between +/−0.4 m/s. In other words, the edges of the Gaussian distribution disappear below the noise level at +/−0.4 m/s. Changes in the power ratio will slightly change also the limits of the band of affected velocities. The precision of the radar electronics will set an upper limit for the power ratio.

In order to create a series of filters using a Gaussian distribution the sigma parameter may stay constant and the power ratio is varied between a low value (for instance 1) and the upper limit of the electronics (for instance 100000). Although the most aggressive filter (the one with the highest power ratio) will filter ground clutter in the most thorough way it also has the potential to erroneously remove precipitation in the most thorough way.

Each candidate signal is subjected to evaluation, which is preferably of the kind illustrated earlier in FIG. 5. In other words, each of the individual blocks 621 to 624 represents the whole multi-criteria evaluation of FIG. 5. The evaluation is made separately for each measurement volume, so effectively a set of four alternatives is produced for each individual measurement volume. The selection at block 631 is made in an order of preference so that for each measurement volume that alternative (unfiltered, filter #1 filtered, filter #2 filtered, filter #3 filtered) is selected where predefined acceptance criteria of a precipitation-dominated signal are fulfilled with the minimum amount of filtering.

The output signal is a set of data where the four candidate signals are provided along with a selection map of the kind illustrated in FIG. 7. The selection map tells, from which candidate signal should the one representing each measurement volume be selected. Another way of providing an output signal would be to just provide a data stream, where only the selected candidate signal for each measurement volume appears. However, if any post-processing needs to be done, where also the other (unselected) candidate signals for a particular measurement volume could be of assistance, it may be more advantageous to have all of them stored.

The evaluation against some of the criteria discussed above involves comparison to one or more neighboring measurement volumes. If the selection of a candidate signal for a particular measurement volume would be allowed to be affected by all possible candidate signals of all other measurement volumes, the combinatorial problem could easily become very large: for example making correct selections among four candidate signals for 8-times-2000 measurement volumes means picking the right one among $4^1$ 6000 possible combinations. However, ground clutter is highly localized: the occurrence of ground clutter in one measurement volume does not necessarily correlate at all with its occurrence in other measurement volumes nearby. Also, we assumed that the difference between the filters is essentially in their capacity of removing ground clutter. As a consequence, it is quite sufficient to make the neighborhood comparisons only within the same candidate signal. In other words, when for example power variability is calculated for the filter #2-filtered alternative of an r:th measurement volume, it is sufficient to use the filter #2-filtered alternatives of the r−1:th and r+1:th measurement volumes in the calculation.

The copolar correlation coefficient and its shift between filters is the most sensible indicator if the amount of ground clutter is relatively low. Most of the time it will decide whether a particular filter or the next strongest will be used. A threshold is needed to define how much of an increase in $\rho_{co}$ is needed to justify the switch to the next strongest filter. This threshold works better if it is not constant. As it is important to have a good estimation of reflectivity and precipitation, the threshold should be higher if the loss of power by switching to the next strongest filter is high. The power loss caused by filtering should control the $\rho_{co}$ increase threshold. For instance, a change of $\rho_{co}$ from 0.980 to 0.983 would be reason to switch to the next stronger filter if the power loss by the next stronger filter is 3%. If the power loss is 80%, the less strong filter is used.

The copolar differential phase is less sensible than the copolar correlation but the thresholds can be applied in a similar way to the copolar correlation coefficient. Both the variability and the distance from the expected value are criteria and the thresholds can be set as constants or they can be affected by other criteria such as the power loss.

One important criterion in the decision making is the power loss in the series of filters. If the amount of ground clutter is large, the filters will reduce the power of the signal more and more until one filter is able to remove all ground clutter, at which point the power no longer decreases but stays significantly higher than the noise level. The correct filter is the first one at the final power level. This case a fairly easy to detect and its criteria can be used to calibrate the system. If the power loss does not stop during filtering it is an indication that there might be precipitation around velocity zero m/s and the filtering is damaging the precipitation.

Finally, the decision making system has to be prepared for the case that there is no precipitation at all in a measurement volume. Ground clutter should still be removed. Biological scatterers such as insects or matter blown up from the earth's surface such as sand and dust do often show up on weather radar displays. Insects and sand are not spherical objects though and the dual-polarization products differ significantly from precipitation. Insects for instance have a low copolar correlation coefficient (below 0.7), a stronger return signal in the horizontal polarization than in the vertical polarization and a stable differential phase which behaves differently from rain. The properties of such scatterers and results from dual-polarization radar measurement are well published. The separation of precipitation and ground clutter is easier than the separation of insects or dust from ground clutter because the high copolar correlation coefficient is a unique feature of precipitation. If all indicators for precipitation fail, the system should consider indicators for other airborne matter. As there is no risk of miscalculating rainfall, the system should err on the side of strong filtering.

9 POST PROCESSING AND SMOOTHING

As explained above, precipitation has a high copolar correlation coefficient (between 0.9 and 1.0) and a stable copolar differential phase which rises slowly with range. Ground clutter on the other hand has a random copolar correlation coefficient and a random copolar differential phase. This means that that the ground clutter in a small number of volumes will have parameters which are the same as precipitation by chance. If the power of the ground clutter is lower than the precipitation little damage is done. If the power is higher, the reflectivity and the amount of precipitation will be overestimated. The effect will be visible on the output display as single volumes with a high reflectivity surrounded by volumes with significantly lower reflectivity.

It can be advantageous to perform additional processing after the main decision making is over. This pass can look for power variability over range, azimuth and elevation and identify volumes of outstanding reflectivity. If these volumes have also been using a less aggressive filter than their neighbors, the filter decision can be upgraded.

For instance, if one volume has a reflectivity three times higher than the surrounding volumes and was filtered using filter #1 while surrounding volumes were filtered by filter #2, the decision should be changed to filter #2.

10 FORM OF THE FILTER

The system of creating candidate signals and choosing one does not depend on the method of filtering. For an ordinary single-PRT weather radar, the Doppler data vector can be Fourier-transformed and then multiplied by a vector of coefficients. For Multi-PRT however, we recommend a matrix filter, operating in the time domain. In this chapter we present a method to construct such a filter to be used in filtering blocks 612, 613 and 614 of FIG. 6.

It has been found that the contribution of ground clutter in a signal containing a noise component can be expressed for example as $$s_{gc} = \left(I + \frac{P_n}{R_{gc}}\right)^{-1} s, \quad (7)$$

where s is a vector containing measurement data, $s_{gc}$ is a vector that expresses the contribution of ground clutter in the measurement data, I is an identity matrix, $R_{gc}$ is a model covariance matrix of the ground clutter which is not restricted to the Gaussian model, and $P_n$ is the power of white noise.

The filtered data, from which ground clutter has been removed, can be expressed with a matrix formula $$s - s_{gc} = \left(I + \frac{R_{gc}}{P_n}\right)^{-1} s = Gs, \quad (8)$$

where G is the filter matrix. The covariance matrix has to be filled with values of the model autocorrelation function according to the pulse intervals in a simple pattern, where lags at moments of time that are opposite numbers are located symmetrically with respect to the matrix diagonal. With pulse intervals of e.g. 1750 μs, 2000 μs, and 2500 μs the pulses are sent at 0 μs, 1750 μs, 3750 μs, 6250 μs, 8000 μs, and so on. The covariance matrix is created as:

$$R_{gc} = \quad (9)$$

| time | 0 | 1750 | 3750 | 6250 | ... |
|---|---|---|---|---|---|
| 0 | ACF(0) | ACF(1750) | ACF(3750) | ACF(6250) | ... |
| 1750 | ACF(−1750) | ACF(0) | ACF(2000) | ACF(4500) | ... |
| 3750 | ACF(−3750) | ACF(−2000) | ACF(0) | ACF(2500) | ... |
| 6250 | ACF(−6250) | ACF(−4500) | ACF(−2500) | ACF(0) | ... |
| ⋮ | ⋮ | ⋮ | ⋮ | ⋮ | ⋱ | where ACF stands for the autocorrelation function and the numerical values are given in microseconds.

In this matrix both indices of the matrix elements correspond to the pulse transmission times t=0 μs, 1750 μs, 3750 μs, 6250 μs, 8000 μs, and so on. The model ACF can be evaluated at any lag, thus all values are available. If the model velocity distribution of the signal (ground clutter) that is to be removed is symmetric and centered at 0 m/s, the ACF, and therefore also the matrix, will be real-valued and symmetric. Parameters for the Filter are:

The ACF describing the velocity distribution. The distribution may be a Gaussian distribution, but other distributions are possible. For example, a simple form like a rectangle in the frequency domain can be written as an ACF. In general, an ACF is the inverse Fourier Transform of the power spectrum in the frequency domain. As an example, for an ACF calculated from a Gaussian frequency distribution the only parameter is the width.

The power factor $P_n$. If the ACF evaluated at 0 is normalized to unity, $P_n$ is defined as the noise power divided by the power of ground clutter.

The dimension of the matrix, which will also be the length of the filter. For the standard timing described earlier this is 48 samples. The dimension can be made higher to process more than one degree in one operation.

Figure 9:
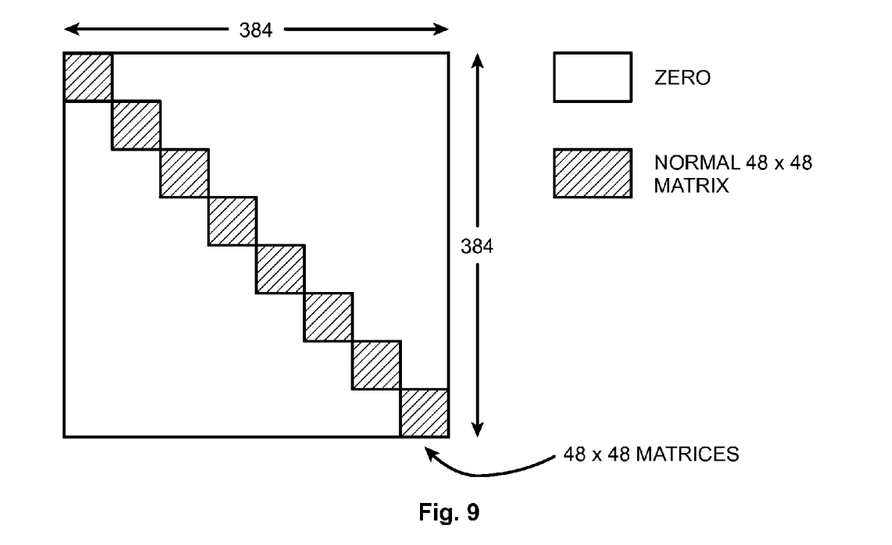
FIG. 9 illustrates an apparatus for processing radar data
Figure 10:
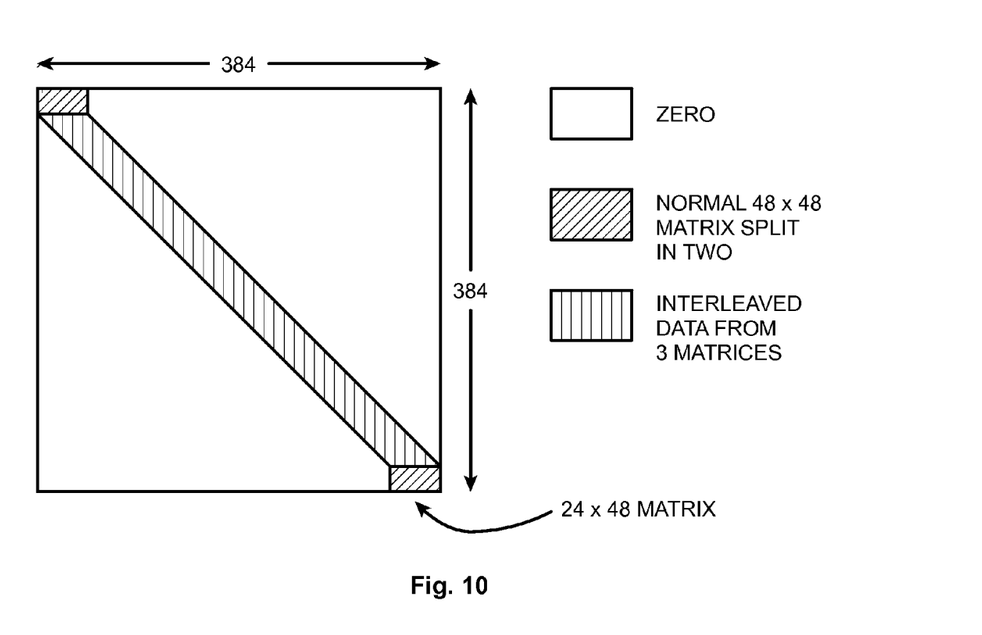
FIG. 10 illustrates a filter matrix which filters data from eight degrees of antenna rotation in one operation but separates the data using a resolution of one degree
Figure 11:
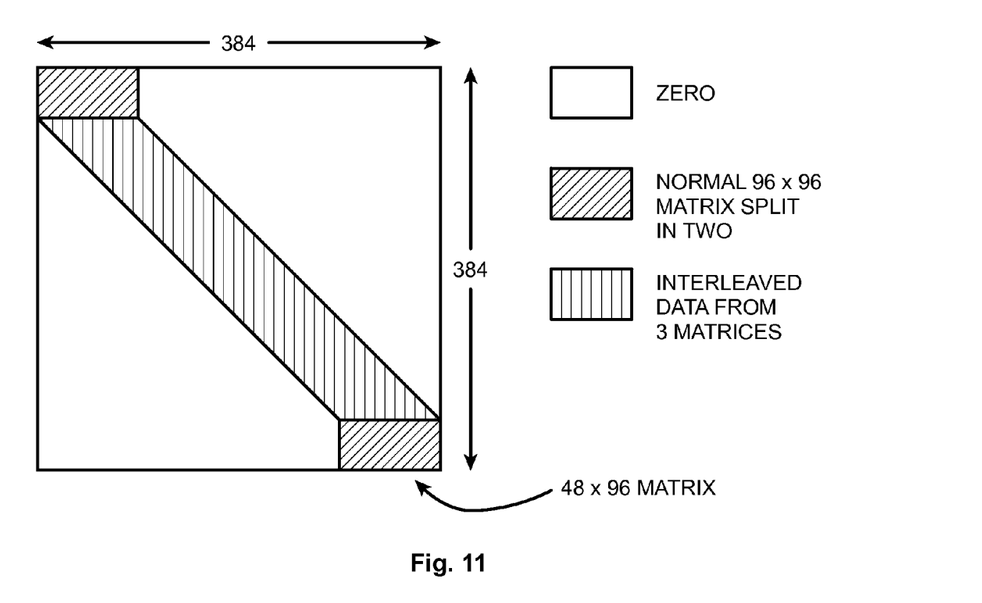
FIG. 11 illustrates a filter matrix using a low-order FIR for the center section

There are many ways of constructing a filter matrix that operates on longer data vectors than the required azimuthal output resolution, but for computational efficiency it is preferable that a short data vector is used. In some embodiments, the filter can be a full matrix operating on a chosen number of samples. In the examples that follow, we have chosen the length of the data vector to contain samples from eight degrees of antenna rotation and the output resolution as one degree. FIG. 9 shows an example where the filter matrix operating on eight degrees is constructed from eight smaller 48-by-48 matrices each of which act on one degree. FIG. 10 illustrates a case where first a 48-by-48 filter matrix is constructed and its 24 first rows are placed in the upper left corner of the full filter matrix and the 24 remaining rows in the lower right corner. The center part of the full matrix is constructed by placing individual rows from 48-by-48 filter matrices. This part of the full matrix can be considered as an FIR filter and the corners as general matrix filters. FIG. 11 shows an example where a similar large filter matrix is constructed from a 96-by-96 filter matrix.

As an alternative, the filter matrix can be calculated from the response in the velocity domain. Above it was shown that $s_{filtered} = Gs_{input}$ where G is the filter matrix. In some embodiments, such as when the ground clutter power spectrum is symmetric with respect to 0 m/s, G becomes real-valued and symmetric. In this example, if we choose a filter matrix of dimension 48-by-48, it has 1176 unknown elements. They can be calculated, for example, using a traditional iterating algorithm for FIR filter design.

11 FINDING THE VELOCITY OR VELOCITY-DISTRIBUTION

Figure 8:
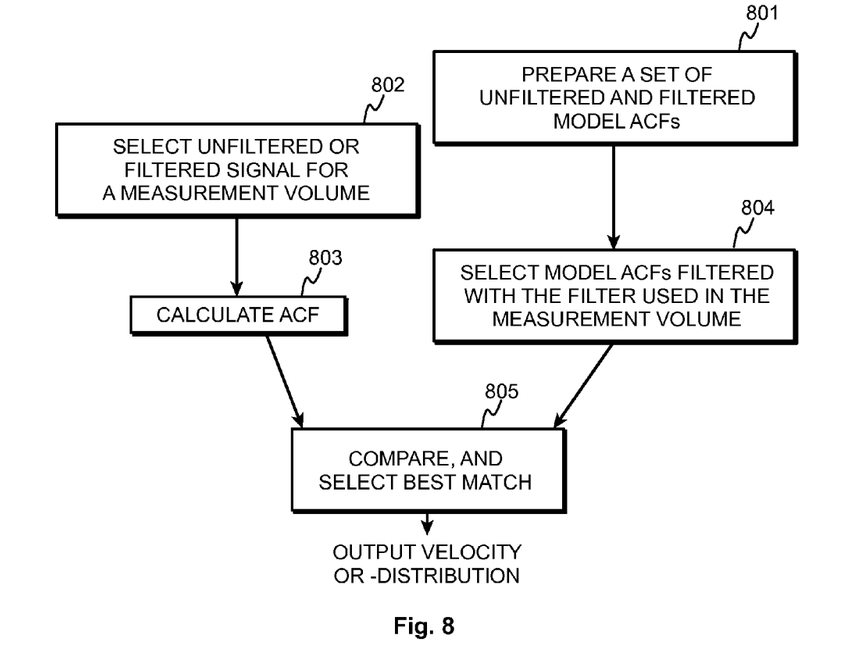
FIG. 8 illustrates finding a best match with model ACFs

FIG. 8 is a schematic illustration of an advantageous implementation of step 403 in the general representation of the method given in FIG. 4. According to step 801, a set of model autocorrelation functions have been prepared and stored. The designation "model ACFs" is used as a shorthand. The model ACFs are autocorrelation functions ACF(p) corresponding to the velocity distributions p (where p denotes the parameters defining the velocity distributions) which pure precipitation (no ground clutter) in different measurement volumes is supposed to have. For the model distribution, either one assumes that a given volume contains one predominant velocity component, or assumes multiple more or less equally important velocities. For weather radars, it is common to assume a Gaussian distribution for each of the components. Note that this is now the velocity distribution for the precipitation while in previous chapters we have discussed the velocity distribution of the ground clutter. For comparison with measured ACFs, the model ACFs are also filtered using the N filters of FIG. 6. This gives a set ACF(p,n) of model ACFs for comparison to measurements.

Step 802 represents the actions that were made according to FIGS. 5 to 7: for any analyzed measurement volume, one filters the received signal using the N filters, and then selects one of these, based on which of these appears to provide the best representation of a pure precipitation-originated signal. At step 803 the autocorrelation function of the selected signal is calculated.

Step 804 represents the selection of the model ACFs filtered using the filter used in step 802, or the unfiltered model ACFs, if in step 802 the unfiltered signal is selected.

At step 805 the calculated autocorrelation function is compared to the selected model ACFs and the best match (for example in the least squares sense) is selected. As an output the method gives the velocity or the parameters of the velocity distribution that the best-matching model ACF referred to. A very advanced way to find the best fit to model ACFs is to use the so-called simulated annealing method, which has been explained in detail in the patent application number EP 12197759.9, which at the time of writing this text is not yet available to the public.

12 Implementation in a Radar Apparatus

Figure 12:
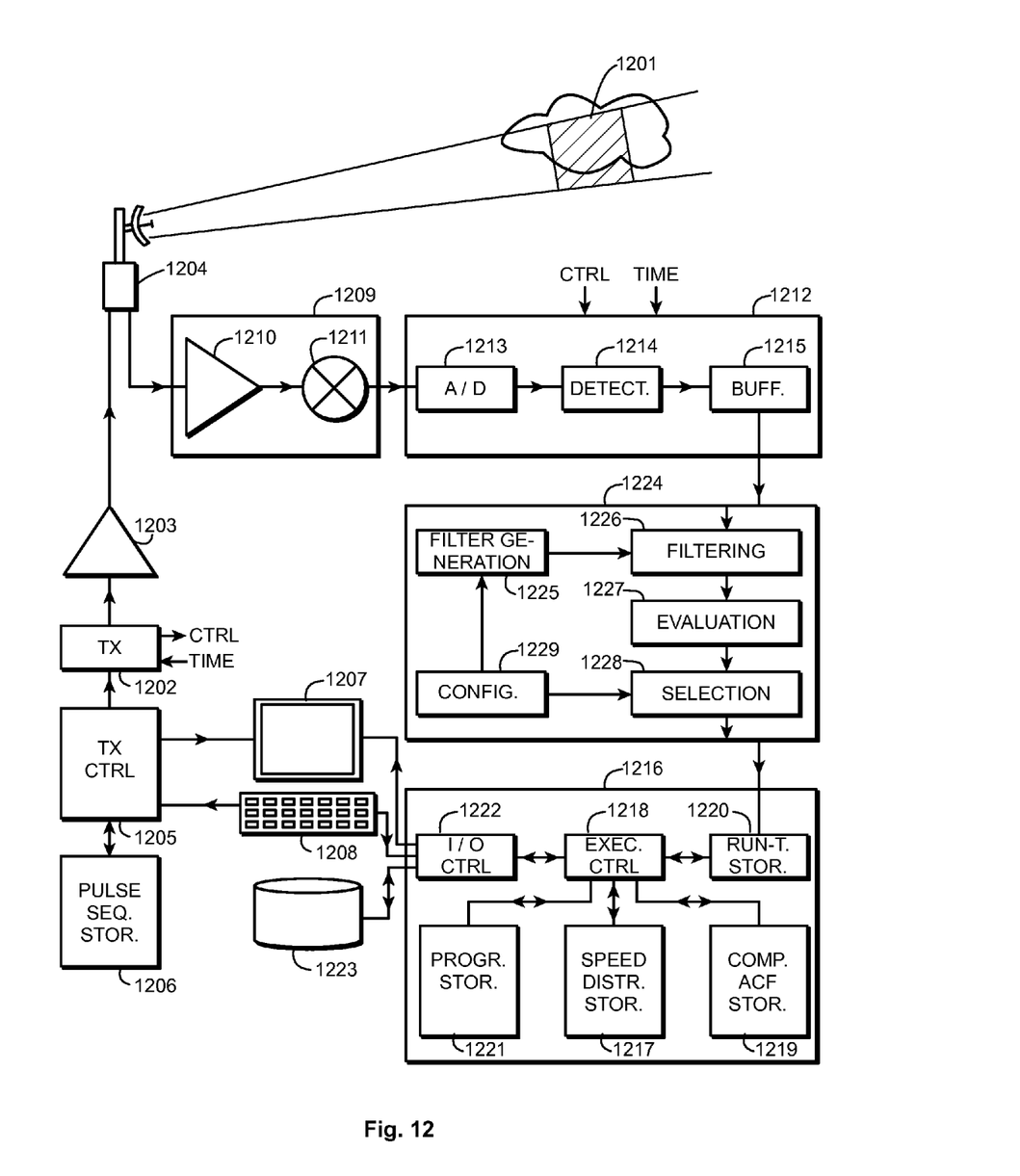
FIG. 12 illustrates a filter matrix using a high-order FIR for the center section

FIG. 12 illustrates schematically a system, a part of which is an arrangement for converting a radar signal into measured velocity values according to an embodiment of the invention. The system of FIG. 12 is a radar system, the task of which is to produce reliable indications of the velocities of scatterers, especially solid particles and/or liquid droplets, in a target volume 1201. It should be emphasized, however, that the present invention is not limited to only weather radars, but is equally applicable to all remote sensing instruments of velocities and velocity distributions, which are likely to detect unwanted clutter from stationary reflectors.

The radar transmission is formed in a transmitter section 1202 and amplified in a transmission amplifier 1203 before being transmitted by an antenna 904. The transmitter section 1202 operates under the control of a transmission controller 1205, one task of which is to select the appropriate pulse sequence from a pulse sequence storage 1206 for transmission. User interface devices are provided for enabling a human user to affect the operation of the transmission side; as examples, a display 1207 and a keyboard or keypad 1208 are shown.

Received signals are directed from the antenna 1204 to an analog reception processing section 1209, which is in FIG. 9 shown to comprise a preamplifier 1210 and a down converter 1211. The down converted received signal is forwarded to a digital reception processing section 1212, which in the example of FIG. 12 comprises an analog to digital converter 1213, a detector section 1214, and a buffer memory 1215. The task of the digital reception processing section 1212 is to produce—and possibly reorder—the digitized samples that represent the echoes received from measurement volumes. Up to storing the samples in the buffer memory 1215 the system of FIG. 9 can follow the guidelines known from prior art pulse radar systems.

The arrangement 1224 comprises a filtering unit 1226 which applies various filters to the output of the digital reception processing section 1212 and creates the candidate signals. The filter parameters are stored in configuration 1229 and coefficients and/or intermediate data for the filters are calculated in the filter generator 1225. It also comprises the evaluator 1227 which calculates values for the criteria described in chapter 7 of this document. It also comprises the selector 1228 which selects one of the candidate signals as described in chapter 8 of this document.

The arrangement 1216 comprises a filter data storage 1217, that is configured to store the filters that are used to produce the candidate signals, or the filter data on the basis of which the filters are calculated on the way as the processing of measurement data proceeds. The arrangement comprises also a model autocorrelation function calculator that is configured to convert estimate distributions to candidate autocorrelation functions that represent autocorrelation data points that the pulse radar system would measure by remotely sensing the target volume 1201 if the distribution of speeds of meteorological scatterers within the target volume would equal a current estimate distribution. In the illustration of FIG. 12, the autocorrelation function calculator comprises parts of the execution controller 1218, the component ACF storage 1219, and the run-time storage 1220.

Together with the run-time storage 1220, the execution controller 1218 constitutes also a measuring unit that is configured to measure the fit of a model ACF to a measured ACF that comprises data points that a pulse radar measured by remotely sensing an actual target volume where actual scatterers had an actual distribution of speeds. Further, the execution controller 1218 also implements a decision maker that is configured to make decisions about accepting or not accepting estimate distributions. The decisions involve accepting the estimate distribution if a measured fit fulfills a predefined acceptance criterion, or modifying a current estimate distribution, and returning processing to the conversion of the modified estimate distribution to an ACF. In order to make the execution controller 918 implement the required functionalities, it is advisable to have in the arrangement 1216 a program storage 1221, in which machine-readable instructions are stored that, when executed by a processor or other kind of execution controller, make it to implement a method according to an embodiment of the invention.

The arrangement 1216 also comprises an output part, here an I/O (input/output) controller 1222, which is configured to output an accepted estimate distribution as a computed distribution of speeds that describes said actual distribution of speeds in the target volume 1201. Typically the output part is configured to combine the accepted estimate distributions of a number of target volumes, for example so that the output given to a user or stored in a mass storage 1223 describes the measured speed distributions within a wide area around the antenna 1204. In FIG. 12 the I/O controller 1222 is shown to have connections to the same user interface devices that are also used for controlling the transmissions. However, this is not a requirement of the invention; the processing, storing, and displaying of measurement results can be made completely separately from the control of the transmission side.

The invention claimed is:

1. A method for converting radar signal into a number of meteorological products such as reflectivity, velocity, rainfall estimate, copolar differential phase and/or velocity moments, comprising:
   providing an input signal that represents the radar echoes received from a number of measurement volumes,
   for each measurement volume, deriving a number of candidate signals, which comprise the original Doppler data vector received from that measurement volume and a number of filtered versions of the original Doppler data vector; each of the said filtered versions being results of filtering performed either in the time domain or in the spectral domain, or any combination thereof,
   selecting from said candidate signals the one that best matches a set of predetermined criteria or rejecting the said candidate signals as not fulfilling the criteria, with criteria comprising of characteristics of a precipitation-originated signal and/or sand or dust-originated signal and/or biological scatter-originated signal and/or an additional set of criteria with known characteristics, and
   deriving and outputting a number of said meteorological products for that measurement volume from the selected candidate signal, if the said candidate signal exists.

2. A method according to claim 1, said set of criteria includes, but is not limited to, one or more of the following criteria:
   criterion characterizing absence of receiver saturation, criteria characterizing precipitation:

difference between the autocorrelation function of the doppler data vector and any constant function is large, a value of measurement-volume-specific variability of the copolar differential phase is small, a value of measurement-volume-specific variability of the received signal power is small, a value of measurement-volume-specific copolar correlation coefficient is large, a value of the deviation of measurement-volume-specific copolar differential phase from an expected value is small, differences of values of rho and phi between filtered signal and ground clutter signal, where ground clutter signal means filtered signal subtracted from original signal, are large, and power of filtered signal divided by the power of said ground clutter signal is not large, criteria characterizing improvement of the match by stronger filtering:

the improvement caused by filtering, of the deviation of measurement-volume-specific copolar differential phase from an expected value is large, a shift in copolar differential phase, caused by filtering, is large, an improvement caused by filtering, of measurement-volume-specific copolar correlation coefficient is large.

3. A method according to claim 2, where a criterion from the list of criteria is satisfied if:

the corresponding value of the criterion is larger than a predefined limit or a limit derived from other criteria in the said list, when the corresponding criterion is that the said value is large, or the corresponding value of the criterion is smaller than a predefined limit or a limit derived from other criteria in the said list, when the corresponding criterion is that the said value is small, or the corresponding difference in the criterion is more than a predefined limit or a limit derived from other criteria in the said list, when the corresponding criterion is that the said difference is large.

4. A method according to claim 2, wherein a said candidate signal is considered to contain a significant amount of ground clutter if at least one of said criteria is not satisfied and is thus considered as a bad match of the said set of predetermined criteria.

5. A method according to claim 2, wherein the extent to which each criteria is satisfied by a candidate signal is used as an input to a neural network, or a fuzzy logic evaluator, or other advanced computational method, the output of which is used to determine the quality of candidate signal match against the set of criteria.

6. A method according to claim 2, wherein a predefined criteria is used as an input to a decision tree process, where said decision tree process is used to determine which candidate signals and which criteria are to be used, where criteria not used by the said decision tree process are used as an input to a neural network, or a fuzzy logic evaluator, or other advanced computational method, the output of which is used to determine the quality of candidate signal match against the set of criteria.

7. A method according to claim 1, wherein the step of deriving and outputting a velocity and/or parameters of that velocity distribution comprises:

a set of parameterized model velocity distributions and corresponding model autocorrelation functions, where model autocorrelation functions consist of both unfiltered and filtered versions of auto-covariance functions (Fourier transformations) of the said model velocity distributions, calculating an autocorrelation function of the selected one of the said candidate signals, finding from the set of those model autocorrelation functions, which correspond to the filter used in selected one of the said candidate signals, that model ACF which gives the best match with the said calculated auto correlation function, outputting that velocity and/or parameters of that velocity distribution as characteristic to a particular measurement volume that the best-matching model autocorrelation function referred to.

8. A method according to claim 7, where the number of model autocorrelation functions in a set is finite and the model autocorrelation functions are pre-calculated, and where finding the best match of model autocorrelation function is performed by comparing the said calculated autocorrelation function to the set of those model autocorrelation functions corresponding to the filter used in selected one of the said candidate signals, to find a best-matching model autocorrelation function.

9. A method according to claim 7, where the said operations are performed in parallel for performance optimization, where parallelization is utilizing one or more of the following:

graphical processing units multithreading vectorization on processor code level clustering on multiple computational units other parallel appliances.

10. A signal processing apparatus for converting a radar signal into a number of meteorological products such as reflectivity, rainfall estimate, copolar differential phase and velocity moments, comprising:

a storage configured to store an input signal that represents the radar echoes received from a number of measurement volumes, a filter bank configured to derive, for each measurement volume, a number of candidate signals, which comprise the original Doppler data vector received from that measurement volume as well as filtered versions of said original Doppler data vector, a signal evaluator configured to select from said candidate signals the one that best matches a set of predetermined criteria or rejects the said candidate signals as not fulfilling the criteria, with criteria comprising of characteristics of a precipitation-originated signal and/or sand or dust-originated signal and/or biological scatter-originated signal and/or an additional set of criteria with known characteristics, and a formatter configured to derive and output a number of said meteorological products, such as reflectivity, velocity value and/or velocity distribution, for a given measurement volume from the selected candidate signal.

11. A remote sensing arrangement comprising a signal processing apparatus according to claim 10.

12. A computer program product, comprising, stored on a nonvolatile computer-readable medium, computer-readable instructions that, when executed by a processor or processors, cause the implementation of a method comprising:

providing an input signal that represents the radar echoes received from a number of measurement volumes, for each measurement volume, deriving a number of candidate signals, which comprise the original Doppler data vector received from that measurement volume and a number of filtered versions of the original Doppler data vector; each of the said filltered versions being results of filltering performed either in the time domain or in the spectral domain, or any combination thereof, selecting from said candidate signals the one that best matches a set of predetermined criteria or rejecting the said candidate signals as not fulfilling the criteria, with criteria comprising of characteristics of a precipitation-originated signal and/or sand or dust-originated signal and/or biological scatter-originated signal and/or an additional set of criteria with known characteristics, and a formatter configured to derive and output a number of said meteorological products, such as reflectivity, velocity value and/or velocity distribution, for a given measurement volume from the selected candidate signal.

* * * * *